(12) United States Patent
Touzard et al.

(10) Patent No.: US 11,413,920 B2
(45) Date of Patent: Aug. 16, 2022

(54) SPRING ELEMENT, IN PARTICULAR JOUNCE BUMPER, FOR A VEHICLE SHOCK ABSORBER

(71) Applicant: BASF Polyurethanes GmbH, Lemfoerde (DE)

(72) Inventors: Anthony Touzard, Lemfoerde (DE); Tim Bauer, Lemfoerde (DE)

(73) Assignee: BASF Polyurethanes GmbH, Lemfoerde (DE)

( * ) Notice: Subject to any disclaimer, the term of this patent is extended or adjusted under 35 U.S.C. 154(b) by 0 days.

(21) Appl. No.: 17/610,327

(22) PCT Filed: May 13, 2020

(86) PCT No.: PCT/EP2020/063363
§ 371 (c)(1),
(2) Date: Nov. 10, 2021

(87) PCT Pub. No.: WO2020/229554
PCT Pub. Date: Nov. 19, 2020

(65) Prior Publication Data
US 2022/0153077 A1 May 19, 2022

(30) Foreign Application Priority Data
May 13, 2019 (EP) ..................................... 19174222

(51) Int. Cl.
*B60G 7/04* (2006.01)
*F16F 1/36* (2006.01)
(Continued)

(52) U.S. Cl.
CPC .............. *B60G 7/04* (2013.01); *F16F 1/3605* (2013.01); *F16F 1/373* (2013.01); *F16F 9/58* (2013.01); *B60G 2204/4502* (2013.01)

(58) Field of Classification Search
CPC . B60G 7/04; B60G 2204/4502; F16F 1/3605; F16F 1/373; F16F 1/3732; F16F 9/58
See application file for complete search history.

(56) References Cited

U.S. PATENT DOCUMENTS 9,308,793 B2 * 4/2016 Fedullo .................. B60G 11/22
2004/0178552 A1 9/2004 Schudt et al.
(Continued)

FOREIGN PATENT DOCUMENTS

| DE | 102004049638 | 4/2006 |
|---|---|---|
| JP | H07257132 | 10/1995 |

OTHER PUBLICATIONS

International Search Report dated Aug. 14, 2020 in PCT/EP2020/063363, 3 pages.
(Continued)

*Primary Examiner* — Xuan Lan Nguyen
(74) *Attorney, Agent, or Firm* — Grüneberg and Myers PLLC

(57) ABSTRACT

A spring element, in particular a jounce bumper, for a vehicle shock absorber contains a longitudinal axis, a base body having a length along the longitudinal axis, and an end portion configured for contact against a damper cap of the vehicle shock absorber. The base body is elastically deformable between an uncompressed basic state and a compressed state in which the base body is at least partially compressed in the direction of the longitudinal axis. The end portion contains a contact surface that is wound along a helix around the longitudinal axis.

20 Claims, 5 Drawing Sheets

(51) Int. Cl.
 *F16F 1/373* (2006.01)
 *F16F 9/58* (2006.01)

(56) References Cited

U.S. PATENT DOCUMENTS

2013/0161888 A1   6/2013  Szekely et al.
2018/0245652 A1*  8/2018  Al-Dahhan ............. F16F 1/377
2019/0118599 A1*  4/2019  Marck ................... F16F 1/3732

OTHER PUBLICATIONS

Written Opinion dated Aug. 14, 2020 in PCT/EP2020/063363, 5 pages.

* cited by examiner

SPRING ELEMENT, IN PARTICULAR JOUNCE BUMPER, FOR A VEHICLE SHOCK ABSORBER

CROSS-REFERENCE TO RELATED APPLICATIONS

This application is the National Stage entry under § 371 of International Application No. PCT/EP2020/063363, filed on May 13, 2020, and which claims the benefit of priority to European Application No. 19174222.0, filed on May 13, 2019. The content of each of these applications is hereby incorporated by reference in its entirety.

BACKGROUND OF THE INVENTION

Field of the Invention

The invention relates to a spring element, in particular jounce bumper, for a vehicle shock absorber. The invention furthermore relates to a vehicle shock absorber having such a spring element, and to a vehicle, in particular a passenger motor vehicle having such a shock absorber.

Description of Related Art

Spring elements of the aforementioned type are generally known. They are used in cars, for example inside the chassis. They are used in particular as vibration-damping spring elements. In addition to the main shock absorber, which is frequently based on metal springs and/or compressed gas elements, use is virtually always made of additional spring elements (additional shock absorbers), preferably composed of resilient material. These spring elements are customarily hollow bodies which are formed concentrically and have different diameters and/or wall thicknesses along the spring axis. In principle, these spring elements could also act as main shock absorbers, but they frequently take on an end stop function in combination with the main shock absorber. They influence the force-travel characteristic of the sprung wheel here by the formation or reinforcement of a progressive characteristic of the vehicle suspension. The pitching effects of the vehicle can thus be reduced and the rolling support reinforced. In particular, the starting rigidity is optimized by the geometrical configuration; this has a crucial effect on the suspension comfort of the vehicle. This function increases the driving comfort and ensures a very high degree of driving safety. The specific configuration of the geometry results in virtually constant component properties over the service life.

One difficulty of the three-dimensional configuration of spring element, i.e. jounce bumper, resides in a frequently desired, particularly soft initial force absorption, which is also referred to as soft starting of the spring element. In order to achieve such a soft starting, laid-open application DE 102004049638, for example, describes forming an end portion of the spring element with encircling bending lips (also referred to as a "flower shape").

In operation, the spring element is compressed from an uncompressed basic state along its longitudinal axis into an at least partially compressed state, thereby dissipating energy by deforming. As has been explained above, the initial stages of the deformation of the spring element determine how soft the spring is perceived. Thus, minimal resistance is desired at the initiation of deformation. Since the overall impact forces on the spring element are significant in vehicle operation, however, the spring element needs to withstand substantial dampening, thus leading to a demand for a progressive increase in stiffness. Apart from the overall modification of the circumferential geometry of the spring element, there was thus a desire to provide further improvements to the spring element which allow soft deformation response in the initial deformation stages on the one hand side, but also provide progressive deformation resistance with increasing deformation on the other hand side.

SUMMARY OF THE INVENTION

It was therefore an object of the invention to provide a spring element of the initially mentioned type which addresses the drawbacks found in the prior art as much as possible. In particular, it was an object of the invention to provide a spring element which allows for soft initial deformation and at the same time improved progressive stiffness with increasing deformation.

The invention achieves the object by suggesting a spring element of the initially mentioned type comprising a longitudinal axis and a base body having a length along the longitudinal axis, the base body being elastically deformable between an uncompressed basic state and a compressed state in which the base body is at least partially compressed in the direction of the longitudinal axis, an end portion configured for contact against a damper cap of the vehicle shock absorber; wherein the end portion comprises a contact surface that is wound along a helix around the longitudinal axis. The contact surface may in other words be described as being at least partially helically wound.

DETAILED DESCRIPTION OF THE INVENTION

Figure 1:
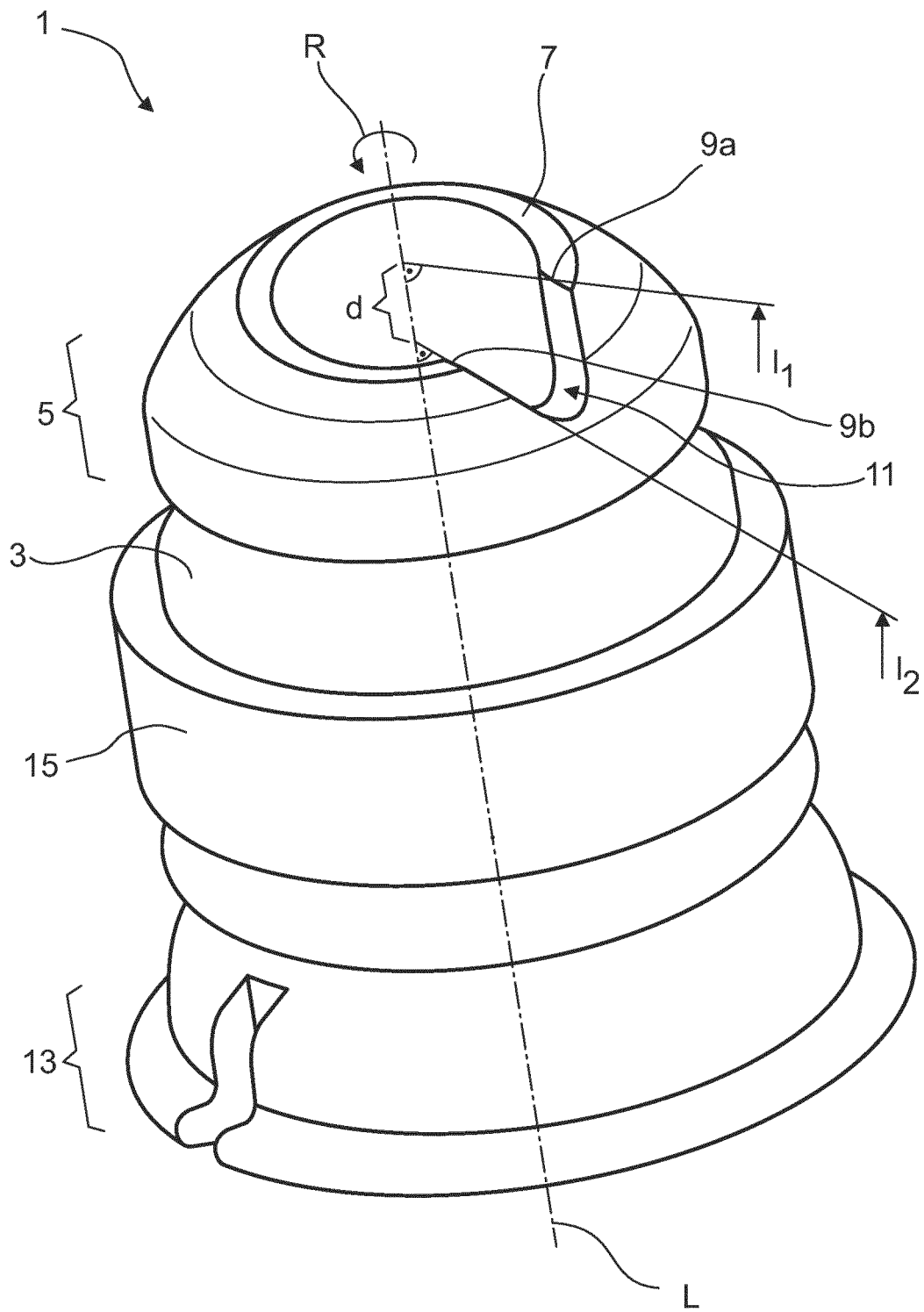
FIG. 1 shows a schematic three dimensional representation of a spring element of a first preferred embodiment.

The invention is based upon the realization that by reducing the overall contact surface of the end portion of the spring element during the initial compression stage of the base body reduces the resistance to deformation initially. According to the invention, this is achieved by having not the entire circumference of the end portion come into contact with the damper cap, but to have only a portion make the first contact with the damper cap, such that only the contact surface of this portion needs to be deformed. It has been found that although the end portion will be slightly deformed in an asymmetrical way during initial deformation, there is no overall negative impact on the compression characteristics of the spring element, quite to the contrary. When the compression increases this from the initial contact onwards, more of the end portion will subsequently come into contact with the damper cap, one after the other, along the direction of the circumference of the end portion such that the effects of the asymmetrical force impact are mitigated. At the same time, with an increasing angular portion of the contact surface coming into contact with the damper cap, the stiffness of the spring element and thus its resistance to compression distinctly increases, leading to a progressive compression resistance. It has been found that the monotonous pitch in the circumferential direction is superior to, for example, alternating height differences of, say, a plurality of projections. A particular advantage of the helical winding contact surface is that the progressive increase in stiffness is achieved very smoothly, leading to a beneficial dampening characteristic when the spring element is used in a vehicle shock absorber.

In a preferred embodiment, the end portion extends in the direction of the longitudinal axis, and has a first end point on the contact surface with a first length, and a second end point on the contact surface with a second length smaller than the first length, and wherein the length of the base body in the direction of the longitudinal axis decreases along the helically wound contact surface between the first end point and second end point.

Preferably, the length decreases monotonously from the first end point to the second end point. Under monotonous decrease, it is understood that from the first end point onwards, the length in the direction of the longitudinal axis increases at no stage along the way. There may be intervals where the length remains constant, however.

In a further preferred embodiment, the helix has a constant pitch angle along at least a portion of the contact surface, preferably in a range of 4° or more, further preferred in a range of 6° or more, particularly preferred in a range of 1° to 30°.

In a further preferred embodiment, the helix has an increasing pitch angle towards the second end point along at least a portion of the contact surface. If the pitch angle increases, the stiffness progression decreases accordingly.

In a further preferred embodiment, the helix additionally or alternatively has a decreasing pitch angle towards the second end point along at least a portion of the contact surface. In such a portion with decreasing pitch angle, the progressivity of the stiffness of the base body increases accordingly.

In a further preferred embodiment, the first and second end points differ by a length differential d in the direction of the longitudinal axis in a range of 1 mm to 15 mm.

In a further preferred embodiment, the first and second end points are angularly spaced apart from one another, in a plane perpendicular to the longitudinal axis, wherein preferably, the helically wound contact surface between the end points spans an angle in a range of 50° to 350° further preferred 340° or more.

In a further preferred embodiment, the base body comprises a recess in between the first and second end points in circumferential section adjacent to the helically wound contact surface, the recess preferably extending in a radial direction towards the longitudinal axis. By inserting a recess between the first and second end point in that region of the end portion that is not covered by the contact surface, the flexibility of the end portion overall is enhanced, leading to improved compression behavior.

In a further preferred embodiment, the helically wound contact surface is a first helically wound contact surface, and the end portion comprises one or more further contact surfaces, wherein one, some or all of these further contact surfaces are also wound along a helix around the longitudinal axis. For example, if two helically wound contact surfaces are provided, each helically wound contact surface preferably spans an angle in a plane perpendicular to the longitudinal axis of 120° or more, further preferably 160° or more.

Preferably, at least one of the one or more further helically wound contact surfaces is offset in the direction of the longitudinal axis from the first helically wound contact surface. Preferably, the offset is dimensioned such that each contact surface has a first end point having the same first length in the direction of the longitudinal axis.

Alternatively, at least one, some or all of the further helically wound contact surfaces is flush with the contact surface of the first helically wound contact surface.

Preferably, at least two adjacent helically wound contact surfaces are separated from one another by a recess, preferably extending in the radial direction towards the longitudinal axis.

In another preferred embodiment having two or more helically wound contact surfaces, the helices extend along different pitch angles. Exemplarily, one helix may have a right-hand pitch while another helix has a left-hand or a different right-hand pitch etc.

In a further preferred embodiment, the base body is partly or completely composed of an elastomer that is compressible in volume, preferably of a cellular polyisocyanate polyaddition product.

The base body here can be composed of an elastomer, but it can also be composed of a plurality of elastomers which are present in layers, in shell form or in another form or also in a mixture with one another. The polyisocyanate polyaddition products are preferably constructed on the basis of microcellular polyurethane elastomers, on the basis of thermoplastic polyurethane or from combinations of said two materials which may optionally comprise polyurea structures.

Microcellular polyurethane elastomers which, in a preferred embodiment, have a density according to DIN 53420 of 200 kg/m3 to 1100 kg/m3, preferably 300 kg/m3 to 800 kg/m3, a tensile strength according to DIN 53571 of 2 N/mm2, preferably 2 N/mm2 to 8 N/mm2, an elongation according to DIN 53571 of 300%, preferably 300% to 700%, and a tear strength according to DIN 53515 of preferably 8 N/mm to 25 N/mm are particularly preferred.

The elastomers are preferably microcellular elastomers on the basis of polyisocyanate polyaddition products, preferably having cells with a diameter of 0.01 mm to 0.5 mm, particularly preferably 0.01 to 0.15 mm.

Elastomers on the basis of polyisocyanate polyaddition products and the production thereof are known in general and described numerously, for example in EP A 62 835, EP A 36 994, EP A 250 969, DE A 195 48 770 and DE A 195 48 771.

Production customarily takes place by reacting isocyanates with compounds which are reactive to isocyanates.

The elastomers on the basis of cellular polyisocyanate polyaddition products are customarily produced in a mold in which the reactive starting components are reacted with one another. Suitable molds here are generally customary molds, for example metal molds, which, on the basis of their shape, ensure the three dimensional shape according to the invention of the spring element. In one embodiment, the contour elements are integrated directly in the casting mold; in a further embodiment, they are retrospectively incorporated into the concentric basic body. In a preferred embodiment, the concentric spring element is cooled for this purpose until it solidifies, preferably with liquid nitrogen, and processed in this state.

The polyisocyanate polyaddition products can be produced according to generally known methods, for example by the following starting substances being used in a single or two stage process:

(a) isocyanate,
(b) compounds reactive to isocyanates,
(c) water and optionally
(d) catalysts,
(e) blowing agents and/or
(f) auxiliary and/or additional substances, for example polysiloxanes and/or fatty acid sulfonates.

The surface temperature of the inner wall of the mold is customarily 40° C. to 95° C., preferably 50° C. to 90° C. The production of the molded parts is advantageously carried out at an NCO/OH ratio of 0.85 to 1.20, wherein the heated starting components are mixed and brought in a quantity corresponding to the desired molded part density into a heated, preferably tightly closing molding tool. The molded parts are cured for 5 minutes to 60 minutes and then can be removed from the mold. The quantity of the reaction mixture introduced into the molding tool is customarily dimensioned in such a manner that the molded bodies obtained have the density already presented. The starting components are customarily introduced into the molding tool at a temperature of 15° C. to 120° C., preferably of 30° C. to 110° C. The degrees of compression for producing the molded bodies lie between 1.1 and 8, preferably between 2 and 6. The cellular polyisocyanate polyaddition products are expediently produced according to the "one shot" method with the aid of high pressure technology, low pressure technology or in particular reaction injection molding technology (RIM) in open or preferably closed molding tools. The reaction is carried out in particular by compression in a closed molding tool. The reaction injection molding technology is described, for example, by H. Piechota and H. Röhr in "Integralschaumstoffe", Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76-84.

The invention has herein above been described with respect to the spring element itself in a first aspect. In a second aspect, the invention also relates to a vehicle shock absorber having a damper bearing, a damper cap mounted movably relative to the damper bearing in a direction of a longitudinal axis, and a spring element is associated with the damper bearing.

In terms of the invention, associating the spring element with the damper bearing and compasses mounting the spring element directly to the damper bearing, or having one or more mechanical amendments intermediate between the spring element and the damper bearing. In particular, the spring element is formed as a jounce bumper.

The invention achieves the initially mentioned object of the first aspect also with respect to the vehicle shock absorber in that the spring element is formed in accordance with any one of the preferred and embodiments described herein above.

The preferred embodiments and benefits of the spring element of the first aspect are at the same time also preferred and embodiments and benefits of the vehicle shock absorber of the second aspect, which is why reference is made to the explanations given above to avoid unnecessary repetition.

In a further aspect the invention, also release to a vehicle comprising a number of vehicle shock absorbers. The invention achieves the object also with respect to the vehicle itself in that at least one of the shock absorbers, preferably some or all of the shock absorbers, are configured according to any one of the preferred embodiments described herein above.

Again the preferred embodiments and benefits of the spring element and of the vehicle shock absorber are at the same time also preferred embodiment and benefits of the vehicle which is why reference is made to the explanations given above to avoid unnecessary repetition.

Figure 2:
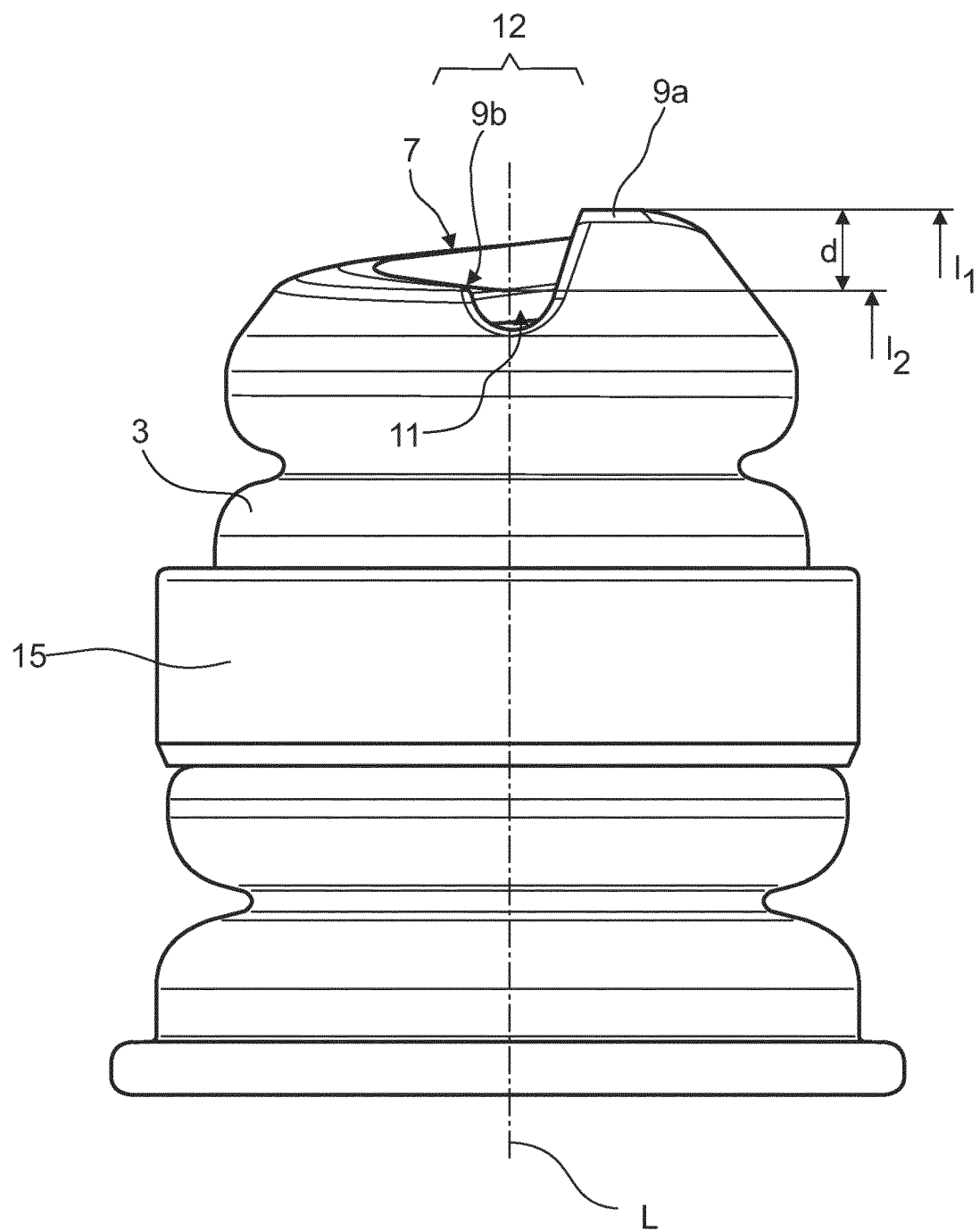
FIG. 2 shows a schematic side-view of the spring element of FIG. 1.
Figure 3:
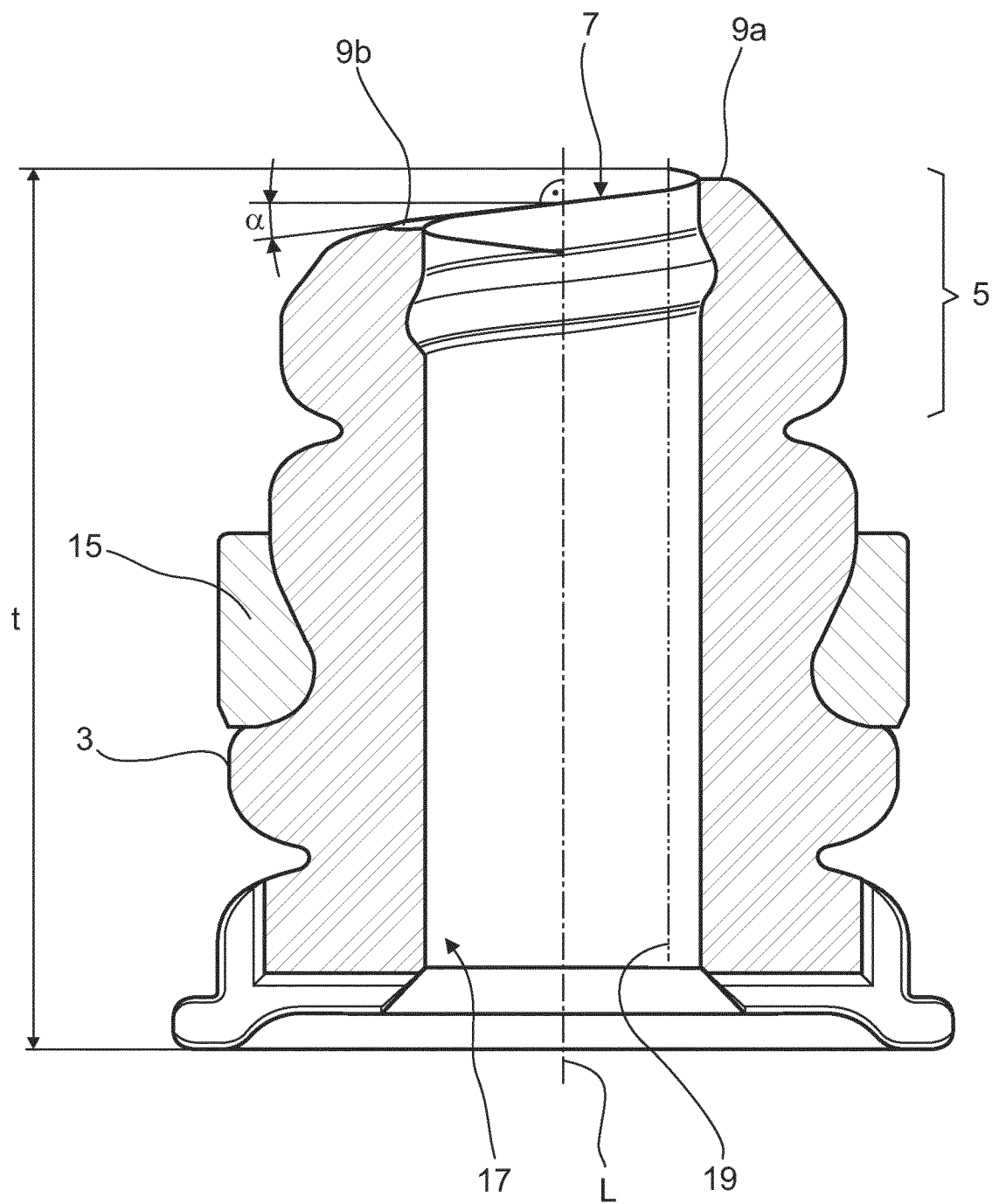
FIG. 3 shows a cross-sectional view of the spring element of FIG. 1 and FIG. 2.
Figure 4:
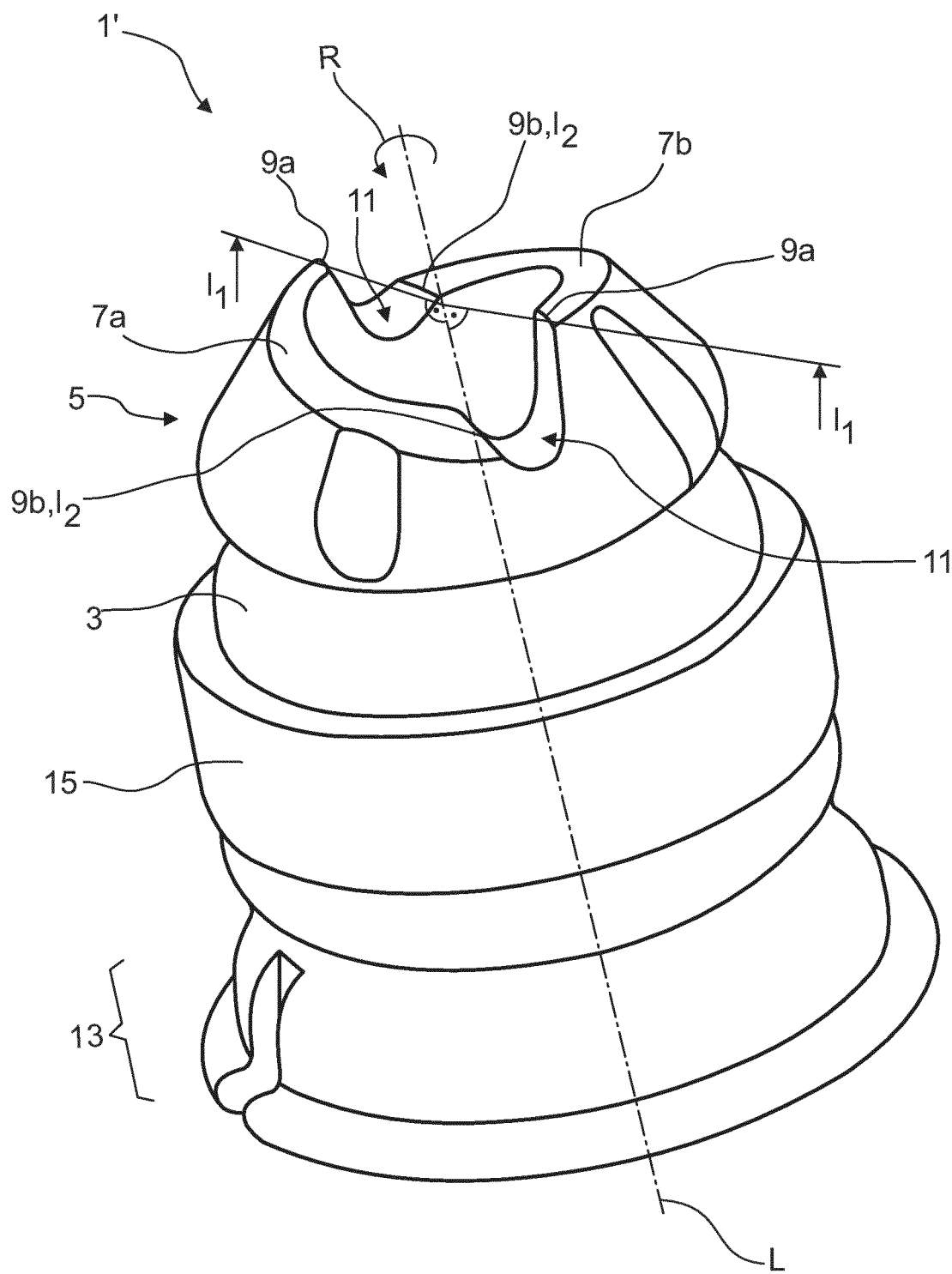
FIG. 4 shows a schematic three dimensional representation of a spring element according to a second preferred embodiment.
Figure 5:
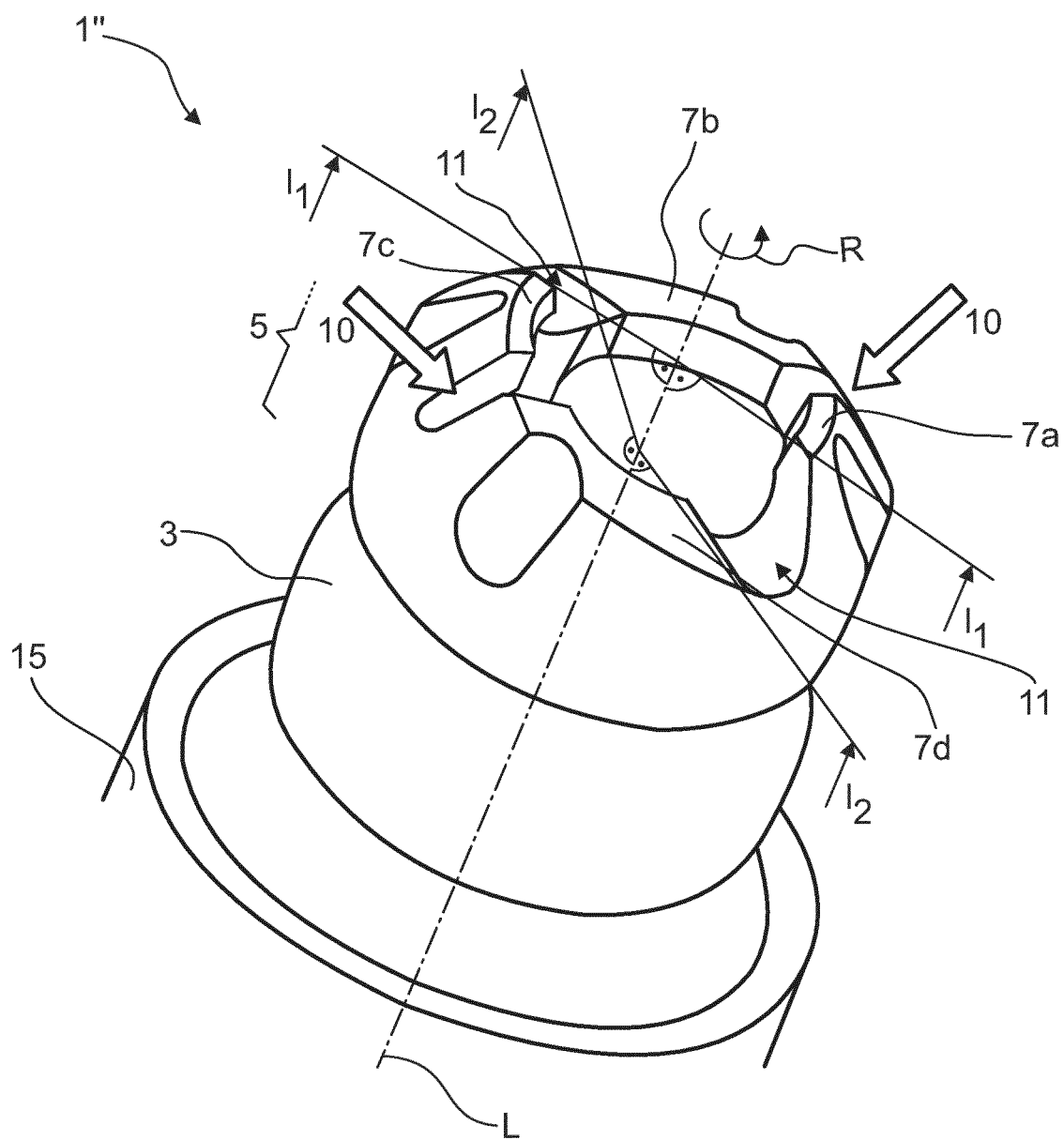
FIG. 5 shows a schematic three dimensional representation of a spring element according to a third preferred embodiment.

The invention will hereinafter be described in more detail with reference to the accompanying drawings of a preferred embodiments herein, FIG. 1 shows a schematic three dimensional representation of a spring element of a first preferred embodiment, FIG. 2 shows a schematic side-view of the spring element of FIG. 1, FIG. 3 shows a cross-sectional view of the spring element of FIGS. 1 and 2, FIG. 4 shows a schematic three dimensional representation of a spring element according to a second preferred embodiment, and FIG. 5 shows a schematic three dimensional representation of a spring element according to a third preferred embodiment.

FIGS. 1 through 3 show a spring element 1 in the form of a jounce bumper. Identical reference signs designate identical elements throughout the drawings. The spring element 1 comprises a base body 3 made out of a microcellular polyurethane foam as described in the preferred embodiments herein above. The base body 3 comprises a longitudinal axis L and a first end portion 5.

The longitudinal axis L defines a circumferential direction indicated by arrow R.

The end portion 5 comprises a contact surface 7 which extends at an end phase of the base body 3, in operation facing the damper cap of the vehicle shock absorber. Unlike in conventional spring elements for these applications, the contact surface 7 is helically wound from a first end point 9a in the end portion 5 to a second end point 9b. The first end point 9a defines the point of first contact with the damper cap and has a first length $l_1$ in the direction of the longitudinal axis L, whereas the second end point 9b has a second length $l_2$ in the direction of the longitudinal axis L that is smaller than the first length $l_1$. The difference between the two lengths $l_1, l_2$ is a length differential d which indicates the overall travel along the contact surface 7 between the two end points 9a, b in the direction of the longitudinal axis L in the end portion 5.

In the circumferential direction, indicated by arrow R, i.e. in a plane perpendicular to the longitudinal axis L, the contact surface 7 spans an angle of preferably 270° or more, leaving a comparatively small angular section that is not helically wound. Preferably, the first and second end points 9a, b are spaced apart from one another by a recess 11 which extends radially towards the longitudinal axis L in the end portion 5 of the base body 3. The recess 11 is located in a circumferential section 12 that is not covered by, but adjacent to, the contact surface 7. The pitch angle α of the contact surface 7 can best be seen in FIG. 3. The second end point 9b is also indicated in FIG. 3, albeit being outside of the cross section explain are shown in FIG. 3. Reference in this regard is made to FIGS. 1 and 2 for clarity.

Opposite of the first end portion 5, the base body 3 comprises a second end portion 13 configured for mounting the spring element 1 to the damper bearing of a shock absorber assembly.

Further preferably, the spring element 1 comprises a recess 17 extending all the way through the base body 3 along the longitudinal axis L. The recess 17 preferably comprises a structured surface. The structure of the contact surface 7 preferably is configured in a form of an irregular structuring, or a regular structure, such as in a form of simple or crosswise grooving, pimpling or polygonal contouring. If formed as an irregular structuring, the structure preferably has the form of a graining.

The graining preferably is also present in the end portion 5.

The spring element 1 comprises a support ring 15 mounted to a circumferential groove extending on the outside of the base body 3. The support ring 15 preferably is partly or completely formed of an elastomer or a duromer, and may optionally comprise metal or other material enforcements for increased stiffness in the radial direction.

While the spring element shown in the accompanying drawings comprises a singular and continuous contact surface 7, the invention also expands to spring elements with a segmented contact surface, i.e. having a number of projections, e.g. two or more projections, and each projection extending in the direction of the longitudinal axis in the end portion 5 of the spring element 1. At least one of those projections, and preferably some or all of the projections, comprises a helically wound contact surface extending around the longitudinal axis as described hereinabove.

As a preferred alternative to the embodiment of FIGS. 1-3, FIG. 4 therefore shows a second embodiment of a spring element 1' which, additionally to a first helically wound contact surface 7a, comprises a second helically wound contact surface 7b. Otherwise, the spring element 1' shown in FIG. 4 is structurally very similar to the spring element 1 of FIGS. 1-3. For identical elements, identical reference signs have therefore been use, and references is made to the description herein above to avoid unnecessary repetition.

The helically wound contact surfaces 7a, 7b shown in FIG. 4 are offset with respect to one another, meaning that the surfaces are not flush with one another. The offset is exemplarily selected such that both contact surfaces 7a, 7b have a first endpoint 9a at a projected first length $l_1$ along the longitudinal axis L. If the sloping angle of the helically contact surfaces 7a, 7b is the same, as it is in FIG. 4, both helically wound contact surfaces 7a, 7b terminated at a second end point 9b at an identical projected length position $l_2$ along the longitudinal axis L.

Further preferably, the helically wound contact surfaces 7a, 7b, are separated from one another at both endpoints 9a, 9b by a respective recess 11 in the manner generally described herein above.

If the offset is shows as depicted in FIG. 4, both contact surfaces will have initial contact with an opposing structural element at the same time or leading to a more symmetrical deformation of the spring element as compared to the embodiment of FIGS. 1-3. However, the sloping angle of the helix or helices will provide a very advantageous and gradual progressivity in stiffness as compression spring element increases.

FIG. 5 exemplarily shows a further embodiment of a spring element 1" in accordance with the invention. The spring element 1" comprises a plurality of helically wound contact surfaces 7a, 7b, 7c and 7d that are spaced apart from one another by recesses 10, 11. Contact surfaces 7a, 7b are flush with respect to one another and separated from one another by one of the recesses 10. Contact surfaces 7b, 7c are offset from one another and separated by one of the recesses 11, just like the adjacent contact surfaces 7a, b according to FIG. 4 described hereinabove.

Contact surfaces 7c and 7d again are flush with respect to one another and separated from one another by one of the recesses 10. Finally, contact surfaces 7d and 7a are offset from one another like in the previous embodiments and separated from one another by recess 11. Contact surfaces 7a and 7c preferably begin at the same length $l_1$, while contact surfaces 7b and 7d preferably terminate at the same length $l_2$.

Preferably, but not necessarily, recesses 11 are located opposite one another, and recesses 10 are also located opposite one another. Particularly preferred, recesses 10, 11, are distributed equidistantly along the circumference of end portion 5 of spring element 1".

The remaining structural features shown in FIG. 5 are essentially identical to the previous embodiments such that for identical functions, identical reference signs have been used in order to avoid unnecessary repetition. Reference is made insofar to the description herein above.

The invention claimed is:

1. A spring element for a vehicle shock absorber, comprising:
    a longitudinal axis and a base body having a length along the longitudinal axis, the base body being elastically deformable between an uncompressed basic state and a compressed state in which the base body is at least partially compressed in the direction of the longitudinal axis, and
    an end portion configured for contact against a damper cap of the vehicle shock absorber;
    wherein the end portion comprises a contact surface that is wound along a helix around the longitudinal axis.

2. The spring element of claim 1, wherein the end portion extends in the direction of the longitudinal axis, and has a first end point on the contact surface with a first length, and a second end point on the contact surface with a second length smaller than the first length, and
    wherein the length of the base body in the direction of the longitudinal axis decreases along the helix between the first end point and the second end point.

3. The spring element of claim 2, wherein the length of the base body decreases monotonously from the first end point to the second end point.

4. The spring element of claim 1, wherein the helix has a constant pitch angle along at least a portion of the contact surface.

5. The spring element of claim 2, wherein the helix has an increasing pitch angle towards the second end point along at least a portion of the contact surface.

6. The spring element of claim 2, wherein the helix has a decreasing pitch angle towards the second end point along at least a portion of the contact surface.

7. The spring element of claim 2, wherein the first end point and second end point differ by a length differential in the direction of the longitudinal axis.

8. The spring element of claim 2, wherein the first end point and second end point are angularly spaced apart from one another.

9. The spring element of claim 2, wherein the base body comprises a recess in between the first end point and second end point in a circumferential section adjacent to the contact surface.

10. The spring element of claim 1, wherein the contact surface is a first contact surface, and
    wherein the end portion comprises one or more further contact surfaces, wherein one, some, or all of these one or more further contact surfaces are also wound along a helix around the longitudinal axis.

11. The spring element of claim 10, wherein at least one of the one or more further contact surfaces is offset in the direction of the longitudinal axis from the first contact surface.

12. The spring element of claim 10, wherein at least one of the one or more further contact surfaces is flush with the first contact surface.

13. The spring element of claim 10, wherein at least two adjacent contact surfaces of the first contact surface and the one or more further contact surfaces are separated from one another by a recess.

14. The spring element of claim 1, wherein the base body is partly or completely composed of an elastomer that is compressible in volume.

15. A vehicle shock absorber, having
a damper bearing;
a damper cap mounted movably relative to the damper bearing in a direction of a longitudinal axis; and
a spring element associated with the damper bearing,
wherein the spring element associated with the damper bearing is the spring element according to claim 1.

16. A vehicle, comprising a number of vehicle shock absorbers, wherein at least one of the shock absorbers is the vehicle shock absorber according to claim 15.

17. The spring element of claim 4, wherein the constant pitch angle is in a range of 1° to 30°.

18. The spring element of clang 7, wherein the length differential is in a range of 1 mm to 15 mm.

19. The spring element of claim 8, wherein the contact surface between the first end point and second end point spans an angle in a range of 50° to 350°.

20. The spring element of claim 14, wherein the base body is partly or completely composed of a cellular polyisocyanate polyaddition product.

* * * * *